US009240909B2

(12) United States Patent
Lozano et al.

(10) Patent No.: US 9,240,909 B2
(45) Date of Patent: Jan. 19, 2016

(54) REVERSE LINK CHANNEL ESTIMATION USING COMMON AND DEDICATED PILOT CHANNELS

(75) Inventors: Angel Lozano, Barcelona (ES); Sivarama Venkatesan, Milltown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1376 days.

(21) Appl. No.: 12/019,381

(22) Filed: Jan. 24, 2008

(65) Prior Publication Data

US 2009/0191835 A1  Jul. 30, 2009

(51) Int. Cl.
*H04B 1/60* (2006.01)
*H04L 25/02* (2006.01)
*H04L 5/00* (2006.01)

(52) U.S. Cl.
CPC ............ *H04L 25/0226* (2013.01); *H04L 5/005* (2013.01); *H04L 5/0051* (2013.01)

(58) Field of Classification Search
USPC ........... 455/334, 272; 375/316, 324; 370/329, 370/341
See application file for complete search history.

(56) References Cited

U.S. PATENT DOCUMENTS

| 6,330,460 | B1 * | 12/2001 | Wong et al. ................. 455/562.1 |
| 7,171,240 | B2 * | 1/2007 | Kim et al. ..................... 455/561 |
| 7,688,909 | B2 * | 3/2010 | Tsutsui .......................... 375/267 |
| 7,751,510 | B2 * | 7/2010 | Budianu et al. ............... 375/346 |
| 7,877,071 | B2 * | 1/2011 | Kong et al. ................. 455/226.1 |
| 8,259,854 | B2 * | 9/2012 | Bastug et al. ................. 375/316 |
| 2004/0125863 | A1 * | 7/2004 | Ghosh ........................... 375/147 |
| 2004/0218697 | A1 * | 11/2004 | Liu ............................... 375/340 |
| 2006/0227886 | A1 * | 10/2006 | Li et al. ......................... 375/260 |
| 2007/0009016 | A1 | 1/2007 | Tsutsui ......................... 375/219 |
| 2007/0070944 | A1 * | 3/2007 | Rinne et al. ................... 370/329 |
| 2007/0099578 | A1 * | 5/2007 | Adeney et al. ................. 455/69 |
| 2012/0082251 | A1 * | 4/2012 | Vanden Bossche ........... 375/259 |

FOREIGN PATENT DOCUMENTS

JP    WO 2007/108392    9/2007    ............. H04J 11/00

OTHER PUBLICATIONS

International PCT Search Report PCT/US2009/000351 dated Aug. 28, 2009.
Written Opinion based on International PCT Search Report PCT/US2009/000351 dated Aug. 28, 2009.
NTT Docomo "Pilot Channel and Scrambling Code in Evolved UTRA Downlink" 3GPP Draft; R1-050589, Jun. 16, 2005.
Motorola "Proposal for Dedicated Pilots in Downlink Precoding for EUTRA MIMO" 3GPP TSG RAN WG1, Feb. 12, 2007, pp. 1-5, XP-002494688.
Chinese Foreign Office Action dated Oct. 29, 2013.

* cited by examiner

*Primary Examiner* — Wesley Kim
*Assistant Examiner* — Richard Chan
(74) *Attorney, Agent, or Firm* — Davidson Sheehan LLP

(57) ABSTRACT

The present invention provides a method of channel estimation implemented in a receiver having multiple antennas configured to receive at least one common pilot available to a plurality of users and a plurality of dedicated pilots. Each dedicated pilot is allocated to one of the plurality of users. The method includes estimating at least one first channel associated with a first user and at least one second channel associated with a second user based on observations of the plurality of dedicated pilots and of said at least one common pilot.

11 Claims, 6 Drawing Sheets

REVERSE LINK CHANNEL ESTIMATION USING COMMON AND DEDICATED PILOT CHANNELS

BACKGROUND OF THE INVENTION

1. Field of the Invention

This invention relates generally to communication systems, and, more particularly, to wireless communication systems.

2. Description of the Related Art

Conventional wireless communication systems include a network of base stations, base station routers, and/or other wireless access points that are used to provide wireless connectivity to access terminals in geographic areas (or cells) associated with the network. Information may be communicated between the network and the access terminals over an air interface using wireless communication links that typically include multiple channels. The channels include forward link (or downlink) channels that carry signals from the base stations to the access terminals and reverse link (or uplink) channels that carry signals from the access terminals to the base station. The channels may be defined using time slots, frequencies, scrambling codes or sequences, or any combination thereof. For example, the channels in a Code Division Multiple Access (CDMA) system are defined by modulating signals transmitted on the channels using orthogonal codes or sequences. For another example, the channels in an Orthogonal Frequency Division Multiplexing (OFDM) system are defined using a set of orthogonal frequencies known as tones or subcarriers.

Next (4th) generation wireless systems such as 802.16e WiMAX, UMTS Long Term Evolution (LTE) and cdma2000 EV-DO Revision C Ultra Mobile Broadband (UMB) are based on Orthogonal Frequency Division Multiple Access. In OFDMA, the transmitted signal consists of narrowband tones that are nearly orthogonal to each other in the frequency domain. A group of tones transmitted over the duration of one time slot (or frame) constitutes the smallest scheduling resource unit, also known as a tile, a resource block (RB), or a base node (BN). Different tones belonging to a tile may be scattered across the entire carrier frequency band used by the OFDMA system so that each tile transmission experiences diversified channels and interference on each sub-carrier. Alternatively, a tile can be formed of a contiguous set of tones so that the channel and interference experienced by the tile are more localized. Hybrid Automatic Repeat reQuest (HARQ) is employed to increase the capacity of the OFDMA system. To this end, the encoder packet transmission includes multiple HARQ interlaces repeating every certain number of frames and having a fixed maximum allowed number of subpacket retransmissions.

Modern wireless systems typically implement coherent detection in both the forward and reverse links. This requires the transmission of pilot signals (which may also be referred to as reference signals or training signals) that can be used as a reference to estimate the amplitude and phase of the fading channel that carries the uplink/downlink signals. For example, on the reverse link, coherent detection requires that each user transmit pilot signals to its serving base station(s). The pilot signals from different mobile units (or different antennas in each mobile unit) can be multiplexed with the data and each other in time, frequency, code or a combination thereof. Typically, a set of common pilot signals are defined and divided among the various users. For example: in an OFDMA (orthogonal frequency division multiple access) system such as the one in FIG. 1, the tones are divided into data tones (open circles in FIG. 1) and common pilot tones (shaded circles in FIG. 1). Each user utilizes some of the common pilot tones, preferably those in the vicinity of its assigned data tones, to send its pilot signals. For example, user A transmits on data tones at the left side of FIG. 1 and therefore also uses the common pilots in this region. User B transmits on data tones at the right side of FIG. 1 and therefore also uses the common pilots in this region.

A growing trend in wireless systems is to equip receivers with multiple antennas. Transmissions from these users are resolved and detected by virtue of their distinct spatial characteristics across the various receive antennas (so-called spatial multiple access or virtual MIMO). This enables several users to share each time/frequency/code resource, e.g., it allows multiple users to transmit concurrently on the same frequency band and with the same code. Detecting concurrent signals is contingent on the receiver having estimates of the amplitude and phase of each of the user channels. Conventional techniques for acquiring these estimates use separate pilot transmissions from each of the users involved. The separate pilot transmissions are used to define the user channels corresponding to the multiple receive antennas. However, the pilot transmissions used to define spatial channels are not conventionally transmitted using common pilot signals because collisions between multiple users significantly reduces the ability of the receiver to detect the pilot signals of the separate users and determine the amplitude and phase of the user channels.

Wireless communication systems that implement spatially defined channels typically include dedicated pilots in addition to the common pilots. The dedicated pilot channels can be assigned to individual users so that the pilot signals transmitted on the dedicated pilot channels do not collide with signals transmitted by other users. For example: in an OFDMA (orthogonal frequency division multiple access) system such as the one in FIG. 2, the tones are divided into data tones (open circles in FIG. 2), common pilot tones (shaded circles in FIG. 2), and dedicated pilot tones (circles with shaded boundaries in FIG. 2). One range of tones on the left-hand side of FIG. 2 is assigned to Users A and C and another range of tones on the right-hand side of FIG. 2 is assigned to Users B and D. Each range of tones includes data tones, common pilot tones, and the dedicated pilot tones that can be assigned to particular users.

Allocating some of the tones to be dedicated pilot tones has a number of drawbacks. For example, the number of dedicated pilots needed to support the users in the system scales with the number of users that are performing spatial multiple access. In contrast, the number of common pilots does not scale with the number of users because all of the users can use the common pilot tones. Consequently, fewer dedicated pilot tones (relative to the potential number of common pilot tones) are typically available to each user in a system that implements dedicated pilot tones. For example, in FIG. 2, each user is allocated a single dedicated pilot tone whereas in the corresponding scenario without spatial multiple access, such as depicted in FIG. 1, each user can be allocated 2-3 common pilots. Moreover, when spatial multiple access with dedicated pilots is implemented, the common pilots are not typically used for channel estimation because of the high probability of collisions between pilot signals transmitted by different users. The common pilots may therefore represent wasted resources. Moreover, because of the reduced number of dedicated pilot channels and the unavailability of the common pilot channels, spatial multiple access systems are at a disadvantage (relative to common pilot channel systems) in terms of channel estimation because less information may be available to estimate the spatial channels.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for channel estimation implemented in a receiver having multiple antennas configured to receive at least one common pilot available to a plurality of users and a plurality of dedicated pilots. Each dedicated pilot is allocated to one of the plurality of users. The method includes estimating at least one first channel associated with a first user and at least one second channel associated with a second user based on observations of the plurality of dedicated pilots and of said at least one common pilot.

In another embodiment of the present invention, a method is provided for channel estimation implemented in a receiver having multiple receive antennas configured to receive at least one common pilot available to a plurality of transmit antennas associated with at least one user and a plurality of dedicated pilots. Each dedicated pilot is allocated to one of the plurality of transmit antennas. The method includes estimating a plurality of channels associated with the plurality of transmit antennas based on observations of the plurality of dedicated pilots and of said at least one common pilot.

In yet another embodiment of the present invention, a method is provided for channel estimation implemented in a plurality of receivers each having at least one receive antenna configured to receive at least one common pilot available to a plurality of users and a plurality of dedicated pilots. Each dedicated pilot is allocated to one of the users. The method includes estimating a plurality of channels associated with the plurality of users based on observations of the plurality of dedicated pilots and of said at least one common pilot.

BRIEF DESCRIPTION OF THE DRAWINGS

The invention may be understood by reference to the following description taken in conjunction with the accompanying drawings, in which like reference numerals identify like elements, and in which.

Figure 1:
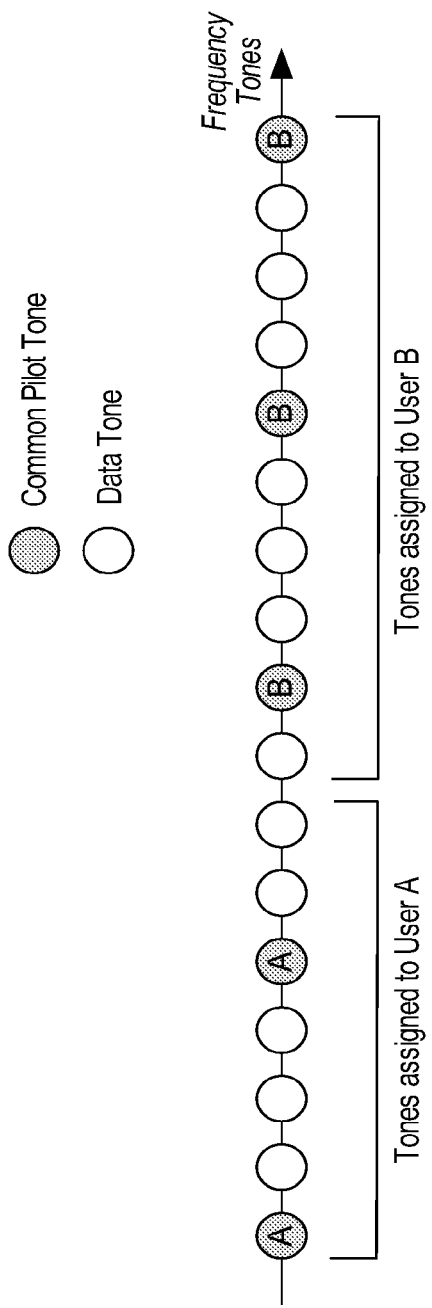
FIG. 1 conceptually illustrates a first exemplary embodiment of a conventional allocation of tones.
Figure 2:
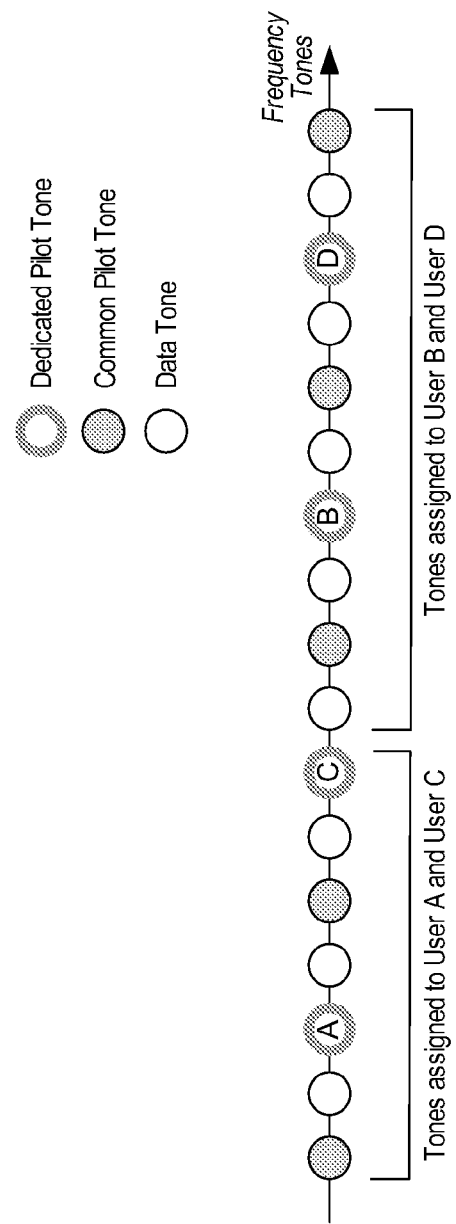
FIG. 2 conceptually illustrates a second exemplary embodiment of a conventional allocation of tones.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 3:
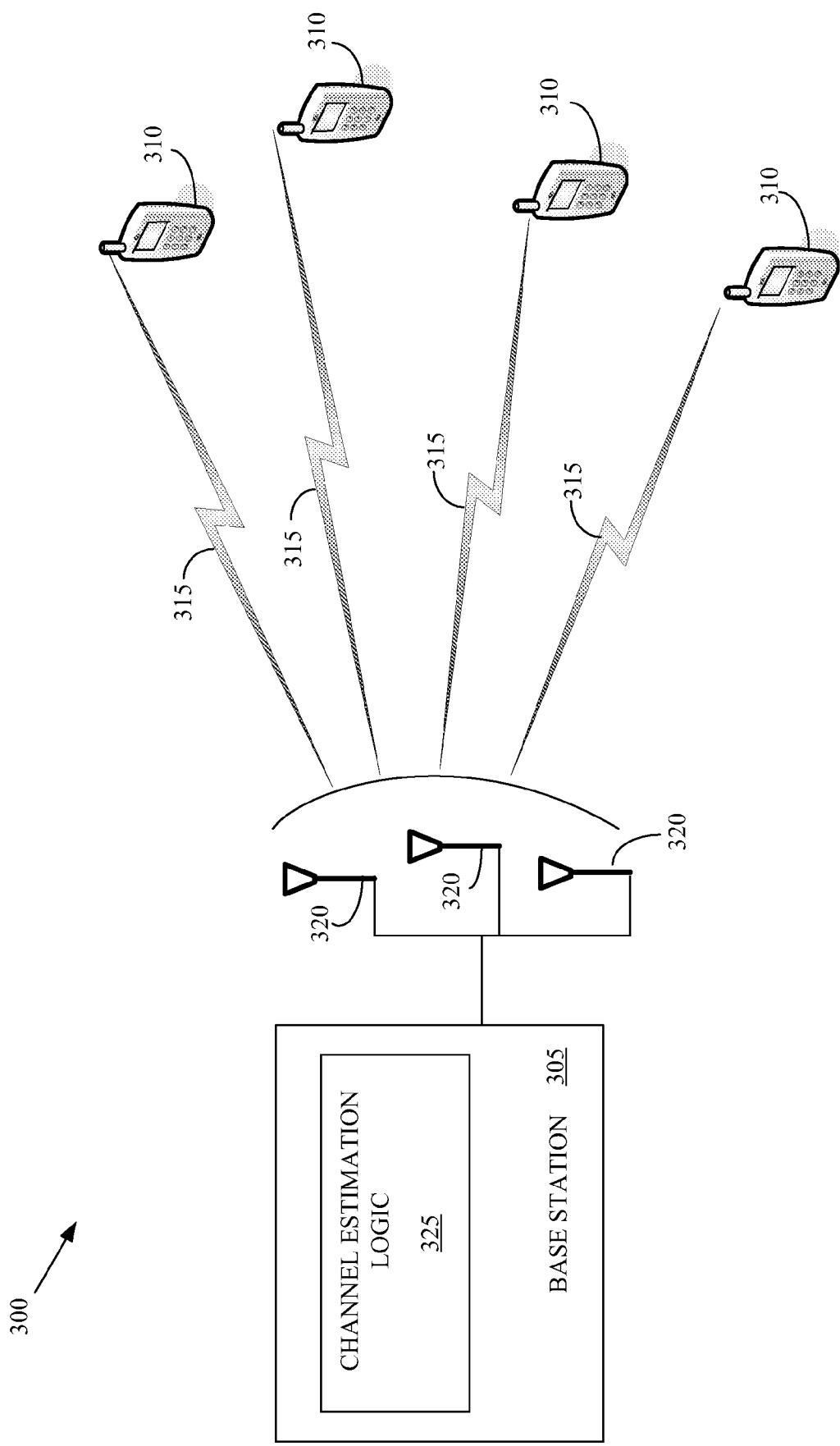
FIG. 3 conceptually illustrates one exemplary embodiment of the wireless communication system, in accordance with the present invention.

FIG. 3 conceptually illustrates one exemplary embodiment of a wireless communication system 300. In the illustrated embodiment, the wireless communication system 300 includes one or more base stations 305 (or access networks) that are used to provide wireless connectivity to mobile units 310 over corresponding air interfaces 315. Persons of ordinary skill in the art having benefit of the present disclosure should appreciate that other terms, such as users, access terminals, subscriber stations, subscriber terminals, and the like may also be used to indicate the mobile units 310. Persons of ordinary skill in the art having benefit of the present disclosure should also appreciate that the number of base stations 305 and/or mobile units 310 shown in FIG. 3 is intended to be illustrative and not to limit the present invention. In alternative embodiments, any number of base stations 305 and/or mobile units 310 may be included in the wireless communication system 300.

Wireless connectivity may be provided according to the standards and/or protocols defined for next (4th) generation wireless systems such as 802.16e WiMAX, UMTS Long Term Evolution (LTE) and cdma2000 EV-DO Revision C Ultra Mobile Broadband (UMB), which are based on Orthogonal Frequency Division Multiple Access (OFDMA) techniques that may implement Hybrid Automatic Repeat reQuest (HARQ) to increase the capacity of the OFDMA system. Techniques for implementing and/or operating systems that provide wireless connectivity according to next generation wireless standards and/or protocols are known in the art and in the interest of clarity only those aspects of implementing and/or operating the systems that are relevant to the present invention will be discussed herein. Furthermore, persons of ordinary skill in the art having benefit of the present disclosure should appreciate that the present invention is not limited to next generation wireless communication systems and/or systems that implement OFDMA. In alternative embodiments, the wireless communication system 300 may be any generation system that operates according to other standards and/or protocols.

The base station 305 and/or the mobile units 310 may be equipped with multiple antennas. In the illustrated embodiment, the base station 305 includes multiple antennas 320 that can be used to transmit and/or receive information over the air interfaces 315. Although only a single antenna is shown attached to each mobile unit 310, in general the mobile units 310 may include multiple antennas. The number of antennas 320 included in the base station 305 and/or mobile units 310 is a matter of design choice and may be different in different embodiments of the wireless communication system 300.

The use of multiple antennas 320 at the base station 305 allows the channels of the air interfaces 315 to be defined in terms of the spatial characteristics of the signals transmitted between the antennas 320 and the mobile units 310. For example, the channel coefficients between each transmit antenna and each receive antenna at user k can be represented as a matrix H. The relationship between transmit and receive signals can be represented as:

$$y=Hx+n$$

where x is a vector containing the transmit signals, y is a vector of received signals at each antenna and n is an noise vector The spatially defined channels may enable several users 310 to share each time/frequency/code resource associated with the air interfaces 315. For example, multiple mobile units 310 may be able to transmit concurrently on the same frequency band and with the same code. In order to detect the concurrent signals, channel estimation logic 325 in the base station is used to make estimates of the amplitude and phase of each of the user channels. Persons of ordinary skill in the art having benefit of the present disclosure should appreciate that the channel estimation logic 325 may be implemented in hardware, firmware, software, or any combination thereof.

In the illustrated embodiment, the channel estimation logic 325 estimates channels of the air interfaces 315 using observations of one or more common pilots and dedicated pilots allocated to the mobile units 310. As used herein, the phrase "common pilot" will be understood to refer to an air interface resource (such as a time slot, a frequency, and/or a code) that is shared by the mobile units 310 and is used to transmit pilot signals over the air interface 315. The phrase "dedicated pilot" will be understood to refer to an air interface resource (such as a time slot, a frequency, and/or a code) that is allocated to a single mobile unit 310 so that this mobile unit can transmit a pilot signal over the air interface 315. Other mobile units 310 are excluded from using the dedicated pilot when it has been allocated. Persons of ordinary skill in the art having benefit of the present disclosure should appreciate that other terms may also be used to indicate common pilots and/or dedicated pilots. For example, in WiMAX, common pilots are called "slot pilots" and the dedicated pilots are called "sounding symbols."

Figure 4:
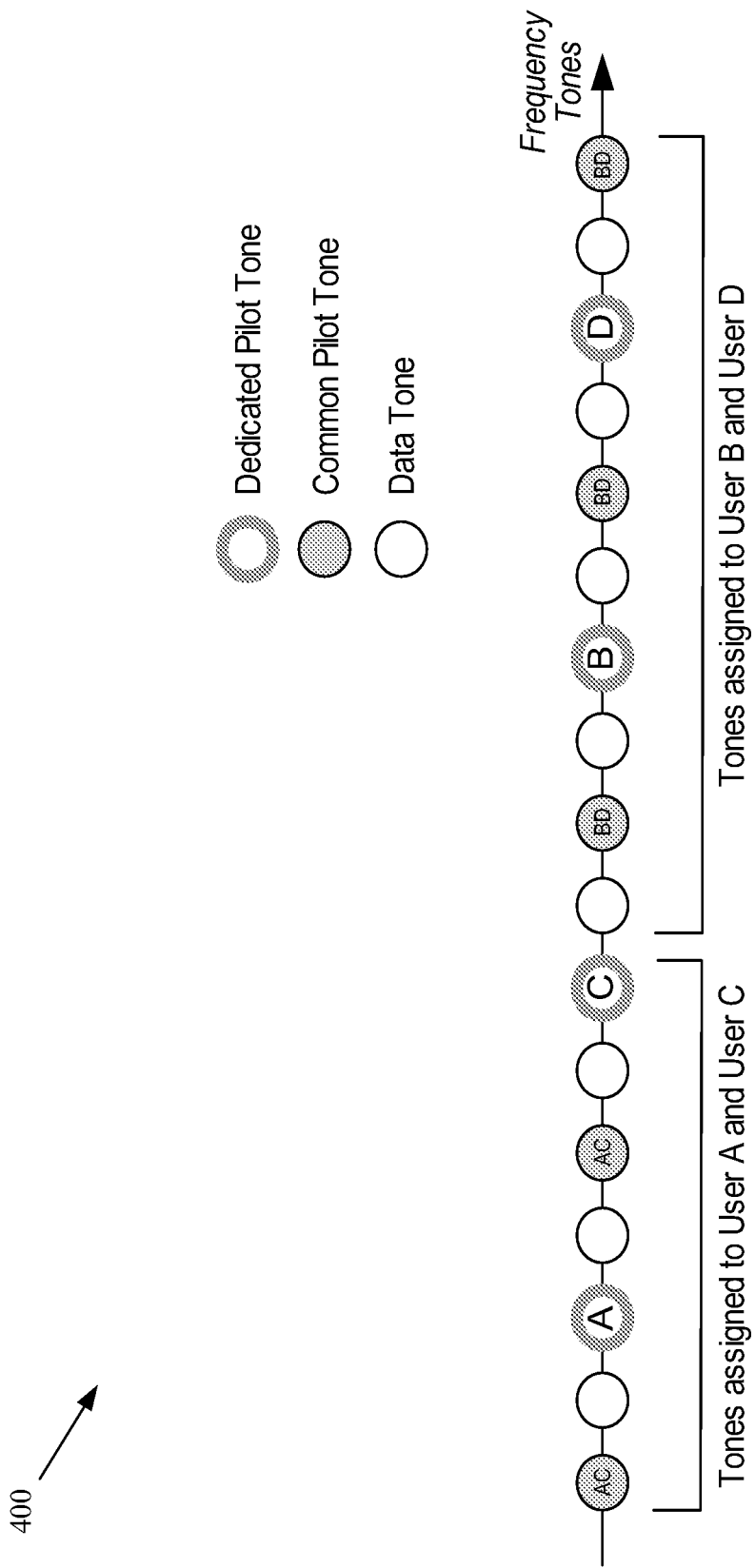
FIG. 4 conceptually illustrates one exemplary embodiment of an allocation of tones, in accordance with the present invention.

FIG. 4 conceptually illustrates one exemplary embodiment 400 of an allocation of tones. In the illustrated embodiment, the frequency tones are defined for an OFDMA (orthogonal frequency division multiple access) system. Although FIG. 4 depicts the various channels (e.g., data channels and/or pilot channels) as being a one-dimensional distribution in frequency, persons of ordinary skill in the art having benefit of the present disclosure should appreciate that the present invention is not limited to this distribution. In alternative embodiments, the channels may be distributed in multiple dimensions corresponding to multiple resources of the air interface. For example, the channels may alternatively be distributed in time and frequency, e.g., the channels may be assigned to points in a 2-dimensional time-frequency grid or rectangle and different parts of this grid may be allocated to data, common pilots, and dedicated pilots.

In the illustrated embodiment, the tones are allocated to data tones (open circles in FIG. 4), common pilot tones (shaded circles in FIG. 4), and dedicated pilot tones (circles with shaded boundaries in FIG. 4). Each user is assigned to a portion of the tones. In the illustrated embodiment, users A and C are assigned to tones on the left-hand side of FIG. 4 and the users B and D are assigned to tones on the right-hand side of FIG. 4. The users may utilize any of the common pilot tones, preferably those in the vicinity of its assigned data tones, to send its pilot signals. For example, users A and C transmit on the common pilots in the frequency band that corresponds to the tones assigned to these users, as indicated by the label "AC" in these tones. Users B and D transmit on the common pilots in the frequency band that corresponds to the tones assigned to these users, as indicated by the label "BD" in these tones.

In the illustrated embodiment, each user is also assigned one dedicated pilot tone, as indicated by the labels "A," "B," "C," and "D" and the various dedicated pilot tones. Although FIG. 4 depicts the dedicated pilots as being frequencies that are assigned to a single user for an undefined period of time, the present invention is not limited to this allocation technique. In alternative embodiments, users may be dynamically assigned to one or more dedicated pilots. For example, user A may be assigned to one dedicated pilot for a selected period of time (and/or selected number of time slots) and then other users may be assigned to this dedicated pilot during other periods of time (or during other time slots). The users may also be assigned to different dedicated pilot tones during different time periods or time slots. Furthermore, users are not limited to using a single dedicated pilot at a time. In some embodiments, one or more users may be assigned to more than one dedicated pilot during a particular time period.

Figure 5:
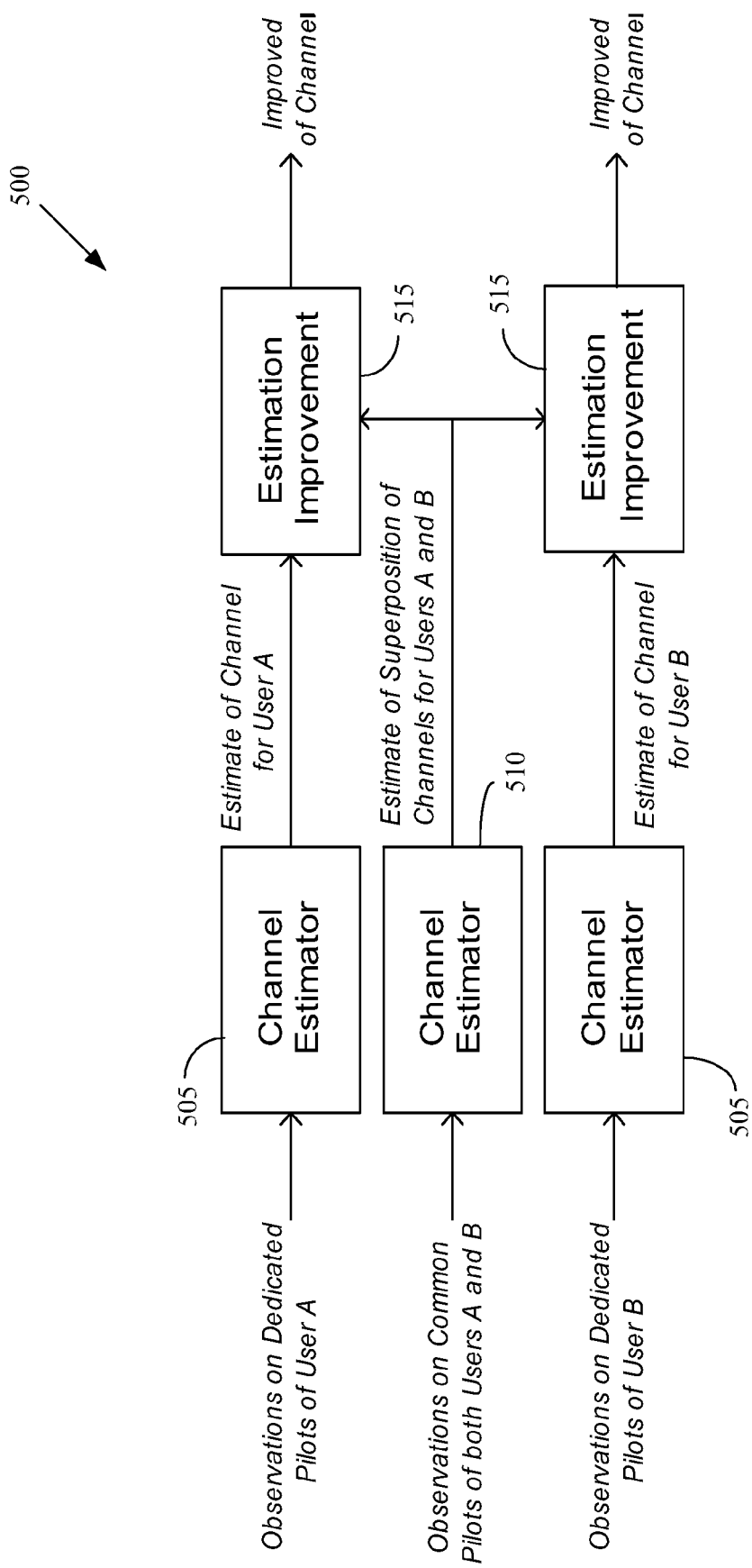
FIG. 5 conceptually illustrates a first exemplary embodiment of channel estimation logic, in accordance with the present invention.

FIG. 5 conceptually illustrates a first exemplary embodiment of channel estimation logic 500. In the first exemplary embodiment, the channel estimation logic 500 estimates the channels associated with users A and B in a two-stage channel estimation process. The channel estimation logic 500 therefore includes channel estimators 505 that are used to form a preliminary estimate of the channels associated with the users A and B based on the observations of the dedicated pilots associated with these users. The channel estimation logic 500 also includes a channel estimator 510 that is used to estimate a superposition of the channels associated with the users A and B based upon the observations of the common pilots that are used by these users. The channel estimation algorithms implemented in the channel estimators 505, 510 are matters of design choice. However, in one embodiment, the channel estimators 505, 510 may implement a minimum mean square criterion that estimates one or more unknowns (i.e., the channels) based upon the available known information (i.e., the observations of the dedicated pilots and/or common pilots). Techniques for estimating wireless communication channels using minimum mean squared criteria are known in the art and in the interest of clarity only those aspects of channel estimation that are relevant to the present invention will be discussed further herein.

The preliminary estimates of the channels associated with the users may then be provided to estimation improvement logic 515. The channel estimator 510 may also provide a signal that indicates the estimate of the superposition of the channels associated with the users A and B to the estimation improvement logic 515, which may generate refined and/or improved estimates of the channels associated with these users using the preliminary estimates and the estimate of the channel superposition. In one embodiment, the estimation improvement logic 515 uses a minimum mean square criterion to determine the improved estimate of the channels associated with the users A and B. The first exemplary embodiment of the channel estimation logic 500 may be relatively simple to implement but may provide a less accurate estimate of the channels because the dedicated pilot information and the common pilot information is incorporated in different stages of the problem solution.

Figure 6:
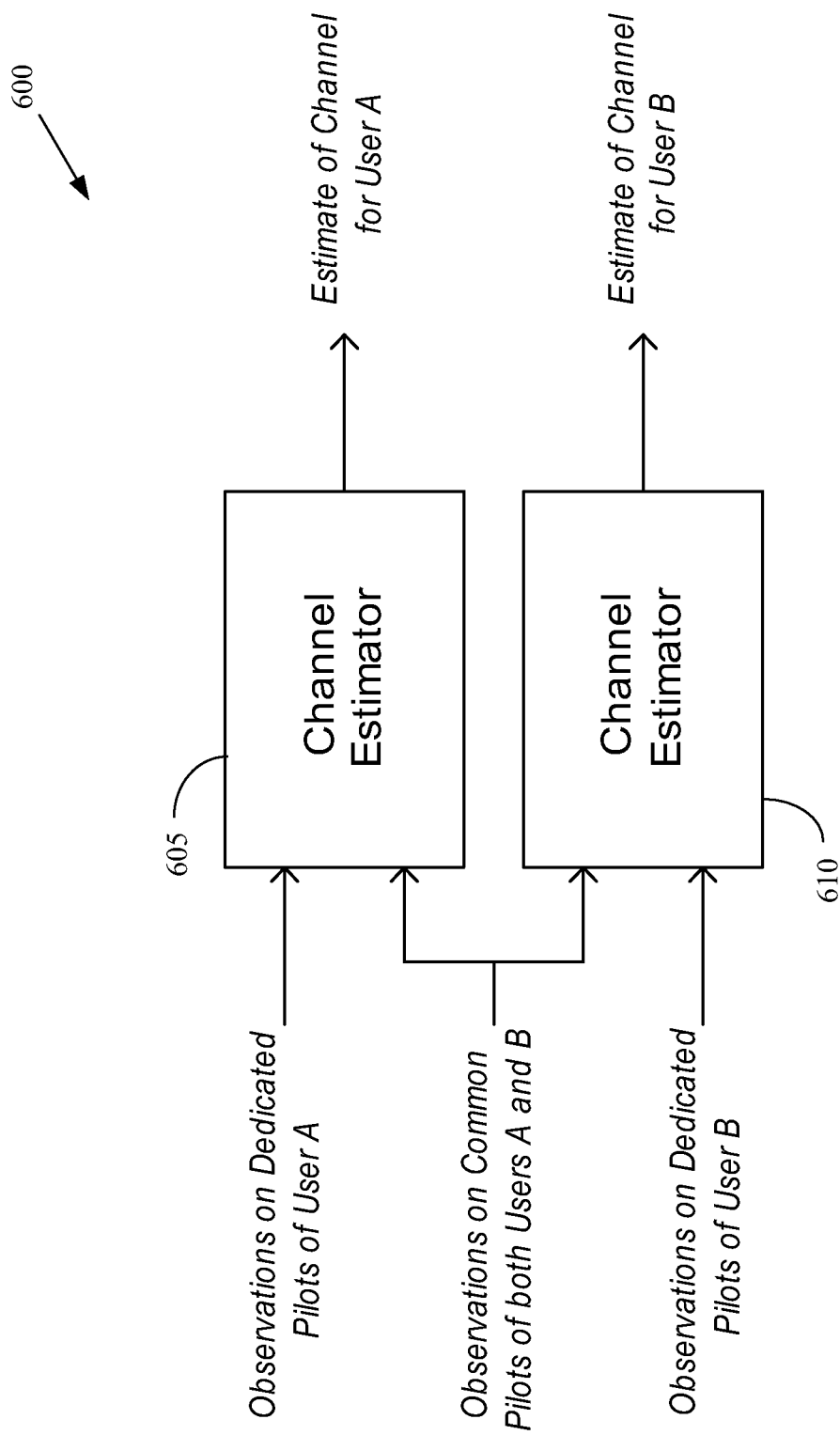
FIG. 6 conceptually illustrates a second exemplary embodiment of channel estimation logic, in accordance with the present invention.

FIG. 6 conceptually illustrates a second exemplary embodiment of channel estimation logic 600. In the second exemplary embodiment, the channel estimation logic 600 includes two channel estimators 605, 610 (i.e., one for each user) that are used to estimate the channels for the users A and B based on observations of the corresponding dedicated pilots and the observations of the common pilots. For example, the channel estimator 605 receive signals indicating the observations of the dedicated pilots allocated to the user A and signals indicating the observations of the common pilots that are used by both the users A and B. The channel estimator 605 may then estimate the channels for the user A based on the corresponding dedicated pilot and the common pilot information. For example, the observations of the dedicated pilot allocated to user A and the observations of the common pilots may be used as inputs to a minimum mean square criterion algorithm, which generates estimates of the channels for user A. The channel estimator 610 may similarly estimate the channels for user B based on the observations of the dedicated pilot allocated to user B and the observations of the common pilots.

Figure 7:
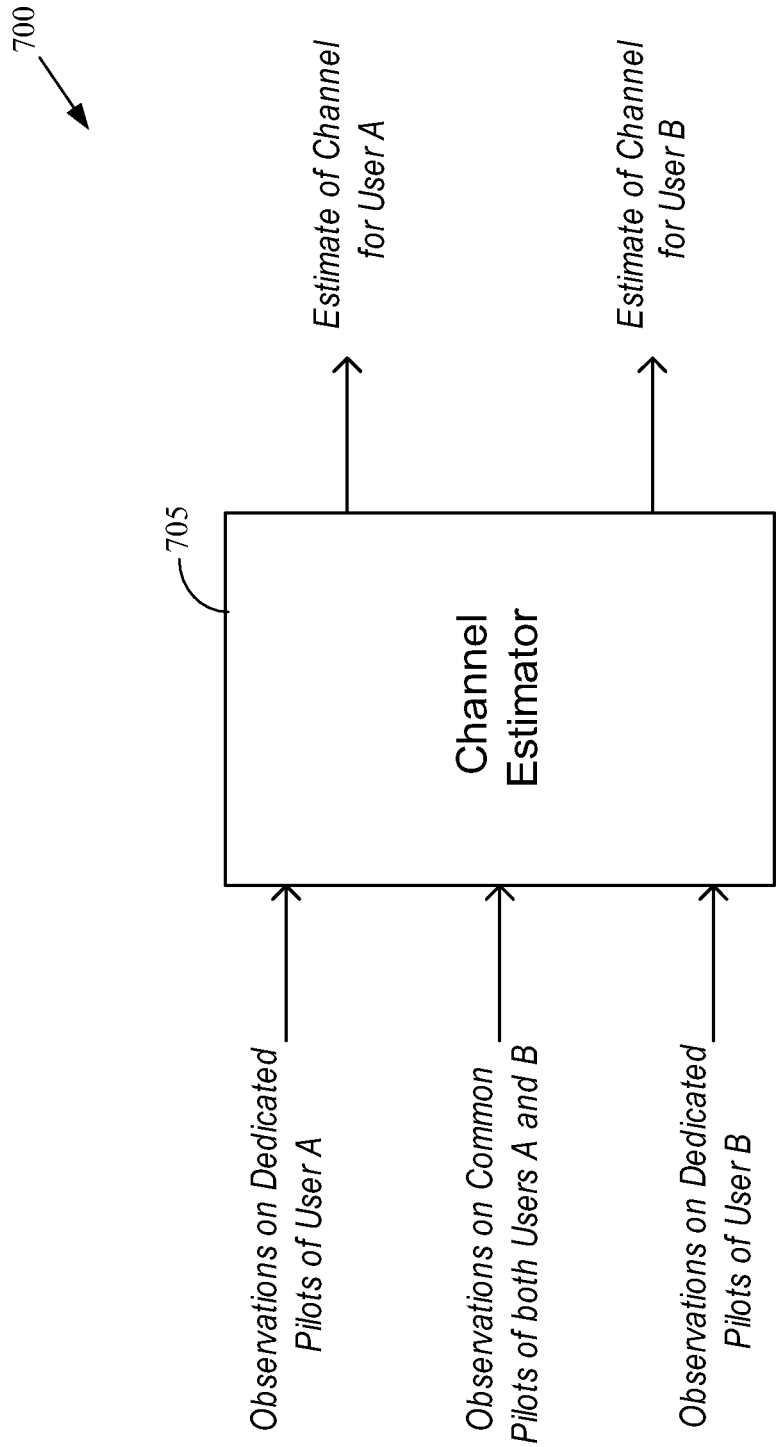
FIG. 7 conceptually illustrates a third exemplary embodiment of channel estimation logic, in accordance with the present invention.

FIG. 7 conceptually illustrates a third exemplary embodiment of channel estimation logic 700. In the third exemplary embodiment, the channel estimation logic 700 includes one channel estimator 705 that is used to concurrently estimate the channels for the users A and B based on observations of the corresponding dedicated pilots and the observations of the common pilots. For example, the channel estimator 705 may receive signals indicating the observations of the dedicated pilots allocated to the user A, observations of the dedicated pilot allocated to user B, and signals indicating the observations of the common pilots that are used by both the users A and B. The channel estimator 705 may then estimate the channels for the user A and user B based on the corresponding dedicated pilots and the common pilot information. For example, the observations of the dedicated pilot allocated to user A, the observations of the dedicated pilot allocated to user B, and the observations of the common pilots may be used as inputs to a minimum mean square criterion algorithm, which generates estimates of the channels for user A and user B. Persons of ordinary skill in the art having benefit of the present disclosure should appreciate that the present invention is not limited to estimating channels for two users. In alternative embodiments, the channel estimation logic 700 may estimate channels for any number of users. Although the third exemplary embodiment of the channel estimation logic 700 may be relatively complex to implement, e.g., compared to the first exemplary embodiment shown in FIG. 5, the channel estimates may be relatively more accurate because the channel estimation logic 710 can account for coupling between the observations of the dedicated pilots and the common pilots.

The various embodiments depicted herein have assumed a wireless communication system in which a base station equipped with multiple antennas receives signals from multiple users concurrently on the same frequency band and with the same code. However, persons of ordinary skill in the art having benefit of the present disclosure should appreciate that the present invention is not limited to this configuration of the wireless communication system. In alternative embodiments, the techniques described herein may be applied in other configurations of the wireless communication system. For example, the spatial channel estimation techniques described herein may be applied to a single user with multiple antennas transmitting signals simultaneously on the same frequency band and with the same code. In this case, each antenna plays the role of a user in the setting described herein so that dedicated pilots are allocated to the separate antennas and used to estimate channels associated with each antenna. For another example, the spatial channel estimation techniques described herein may be applied to a plurality of users, each with multiple antennas that transmit concurrently on the same frequency band and with the same code. Each antenna of each user plays the role of a user in the setting described herein so that dedicated pilots are allocated to the separate antennas and used to estimate channels associated with each antenna. For yet another example, the spatial channel estimation techniques described herein may be applied to a wireless communication system that includes multiple base stations that perform coordinated reception of pilots from one or more users. Each of the multiple base stations may include one or more antennas so that when the base stations are coordinated may act as a single entity that receives communication over multiple antennas.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed is:

1. A method of channel estimation implemented in a receiver having multiple antennas configured to receive signals over a plurality of orthogonal tones comprising at least one common pilot tone shared by a plurality of users for transmission of pilot signals and a plurality of dedicated pilot tones, each dedicated pilot tone being allocated to one of the plurality of users for transmission of pilot signals, comprising:

concurrently estimating, at the receiver, at least one first channel associated with a first user and at least one second channel associated with a second user based on observations of pilot signals received at the receiver concurrently over at least one first dedicated pilot tone allocated to the first user, at least one second dedicated pilot tone allocated to the second user, and said at least one common pilot tone, wherein estimating said at least one first channel and said at least one second channel comprises:

estimating said at least one first channel based on observations of the at least one first dedicated pilot tone allocated to the first user;

estimating said at least one second channel based on observations of the at least one second dedicated pilot tone allocated to the second user; and estimating at least one composite channel associated with the first and second users based on observations of said at least one common pilot tone.

2. The method of claim 1, wherein estimating said at least one first channel and said at least one second channel comprises:

refining said at least one estimated first channel based on said at least one estimated composite channel; and refining said at least one estimated second channel based on said at least one estimated composite channel.

3. The method of claim 1, A method of channel estimation implemented in a receiver having multiple antennas configured to receive signals over a plurality of orthogonal tones comprising at least one common pilot tone shared by a plurality of users for transmission of pilot signals and a plurality of dedicated pilot tones, each dedicated pilot tone being allocated to one of the plurality of users for transmission of pilot signals, comprising:

concurrently estimating, at the receiver, at least one first channel associated with a first user and at least one second channel associated with a second user based on observations of pilot signals received at the receiver concurrently over at least one first dedicated pilot tone allocated to the first user, at least one second dedicated pilot tone allocated to the second user, and said at least one common pilot tone, wherein estimating said at least one first channel comprises estimating said at least one first channel based on observations of pilot signals received over the at least one first dedicated pilot tone allocated to the first user and the observations of said pilot signals received over said at least one common pilot tone.

4. The method of claim 3, wherein estimating said at least one second channel comprises estimating said at least one second channel based on observations of the at least one second dedicated pilot allocated to the second user and the observations of said pilot signals received over said at least one common pilot tone.

5. A method of channel estimation implemented in a receiver having multiple antennas configured to receive signals over a plurality of orthogonal tones comprising at least one common pilot tone shared by a plurality of users for transmission of pilot signals and a plurality of dedicated pilot tones, each dedicated pilot tone being allocated to one of the plurality of users for transmission of pilot signals, comprising:

concurrently estimating, at the receiver, at least one first channel associated with a first user and at least one second channel associated with a second user based on observations of pilot signals received at the receiver concurrently over at least one first dedicated pilot tone allocated to the first user, at least one second dedicated pilot tone allocated to the second user, and said at least one common pilot tone, wherein concurrently estimating said at least one first channel and said at least one second channel comprises concurrently estimating said at least one first channel and said at least one second channel based on observations of pilot signals received over the at least one first dedicated pilot tone allocated to the first user, observations of pilot signals received over the at least one second dedicated pilot tone allocated to the second user, and the observations of the pilot signals received over said at least one common pilot tone to account for coupling of the first and second channels indicated in the observations of the pilot signals received over said at least one common pilot tone.

6. A method of channel estimation implemented in a receiver having multiple receive antennas configured to receive signals transmitted over a plurality of orthogonal tones comprising at least one common pilot tone shared by a plurality of transmit antennas associated with at least one user for transmission of pilot signals and a plurality of dedicated pilot tones, each dedicated pilot tone being allocated to one of the plurality of transmit antennas for transmission of pilot signals, comprising:

concurrently estimating, at the receiver, a plurality of channels associated with the plurality of transmit antennas based on observations of pilot signals received concurrently at the receiver from the plurality of transmit antennas over the plurality of dedicated pilot tones and said at least one common pilot tone, wherein estimating the plurality of channels comprises:

estimating the plurality of channels based on observations of the pilot signals received over the plurality of dedicated pilot tones;

estimating at least one composite channel associated with the plurality of transmit antennas based on observations of the pilot signals received over said at least one common pilot tone; and refining the plurality of estimated channels based on said at least one estimated composite channel.

7. The method of claim 6, wherein concurrently estimating the plurality of channels comprises independently estimating channels associated with each transmit antenna based on observations of pilot signals received over at least one dedicated pilot tone allocated to a corresponding transmit antenna and the observations of the pilot signals transmitted over said at least one common pilot tone.

8. A method of channel estimation implemented in a receiver having multiple receive antennas configured to receive signals transmitted over a plurality of orthogonal tones comprising at least one common pilot tone shared by a plurality of transmit antennas associated with at least one user for transmission of pilot signals and a plurality of dedicated pilot tones, each dedicated pilot tone being allocated to one of the plurality of transmit antennas for transmission of pilot signals, comprising:

concurrently estimating, at the receiver, a plurality of channels associated with the plurality of transmit antennas based on observations of pilot signals received concurrently at the receiver from the plurality of transmit antennas over the plurality of dedicated pilot tones and said at least one common pilot tone, wherein concurrently estimating the plurality of channels comprises concurrently estimating the plurality of channels based on concurrent observations of the pilot signals received over the dedicated pilot tones allocated to the corresponding plurality of users and the observations of the pilot signals transmitted over said at least one common pilot tone.

9. A method of channel estimation implemented in a plurality of receivers each having at least one receive antenna configured to receive signals over a plurality of orthogonal tones comprising at least one common pilot tone shared by a plurality of users for transmission of pilot signals and a plurality of dedicated pilot tones, each dedicated pilot tone being allocated to one of the users for transmission of pilot signals, comprising:

concurrently estimating, at the plurality of receivers, a plurality of channels associated with the plurality of users based on observations of pi lot signals received concurrently at the plurality of receivers from the plurality of users over the plurality of dedicated pilot tones and said at least one common pilot tone, wherein estimating the plurality of channels comprises:

estimating the plurality of channels based on observations of pilot signals received over the plurality of dedicated pilot tones;

estimating at least one composite channel associated with the plurality of users based on observations of pilot signals received over said at least one common pilot tone; and refining the plurality of estimated channels based on said at least one estimated composite channel.

10. A method of channel estimation implemented in a plurality of receivers each having at least one receive antenna configured to receive signals over a plurality of orthogonal tones comprising at least one common pilot tone shared by a plurality of users for transmission of pilot signals and a plurality of dedicated pilot tones, each dedicated pilot tone being allocated to one of the users for transmission of pilot signals, comprising:

concurrently estimating, at the plurality of receivers, a plurality of channels associated with the plurality of users based on observations of pilot signals received concurrently at the plurality of receivers from the plurality of users over the plurality of dedicated pilot tones and said at least one common pilot tone, wherein concurrently estimating the plurality of channels comprises independently estimating channels associated with each user based on observations of pilot signals received over at least one dedicated pilot tone allocated to a corresponding user and the observations of the pilot signals received over said at least one common pilot tone.

11. A method of channel estimation implemented in a plurality of receivers each having at least one receive antenna configured to receive signals over a plurality of orthogonal tones comprising at least one common pilot tone shared by a plurality of users for transmission of pilot signals and a plurality of dedicated pilot tones, each dedicated pilot tone being allocated to one of the users for transmission of pilot signals, comprising:

concurrently estimating, at the plurality of receivers, a plurality of channels associated with the plurality of users based on observations of pilot signals received concurrently at the plurality of receivers from the plurality of users over the plurality of dedicated pilot tones and said at least one common pilot tone, wherein concurrently estimating the plurality of channels comprises concurrently estimating the plurality of channels based on observations of pilot signals received over the dedicated pilot tones allocated to the plurality of users and the observations of the pilot signals received over said at least one common pilot tone.

* * * * *